United States Patent [19]

Severson

[11] 4,399,737

[45] Aug. 23, 1983

[54] CORRUGATED AIR RETURN BULKHEAD

[75] Inventor: Sylvester B. Severson, Rice Lake, Wis.

[73] Assignees: J. Charles Peterson; Roger Nelson, both of Rice Lake, Wis.

[21] Appl. No.: 272,123

[22] Filed: Jun. 10, 1981

[51] Int. Cl.³ ............................................... B60H 1/26
[52] U.S. Cl. .......................................... 98/6; 62/239; 165/41; 165/55; 165/139
[58] Field of Search ...................... 98/4, 6, 51, 52, 53, 98/54, 55; 62/239, 407, 413, 414; 165/55, 53, 129, 139, 41

[56] References Cited

U.S. PATENT DOCUMENTS

| | | | |
|---|---|---|---|
| 175,543 | 3/1876 | Wickes | 62/413 X |
| 1,071,449 | 8/1913 | McAfee | 62/413 |
| 2,534,272 | 12/1950 | Kleist | 62/414 X |
| 2,923,384 | 2/1960 | Black | 62/239 X |
| 2,978,884 | 4/1961 | D'Aleandro et al. | 62/413 |
| 3,100,384 | 8/1963 | Lowensohn | 62/239 X |
| 3,206,946 | 9/1965 | Lindersmith et al. | 98/6 X |
| 3,308,738 | 3/1967 | Heimann | 98/6 |

Primary Examiner—Albert J. Makay
Assistant Examiner—Harold Joyce
Attorney, Agent, or Firm—Harvey B. Jacobson

[57] ABSTRACT

An air return bulkhead is provided for mounting on the interior surface of one upstanding wall of a container, the container wall supporting an airflow heat exchanger assembly on an upper portion thereof including a central downwardly opening air inlet, a pair of upper opposite side horizontally and oppositely outwardly opening air inlets and a central upper temperature conditioned air outlet. The bulkhead is constructed to define an upstanding return airflow path extending upwardly along the one wall with the airflow path including a central portion and a pair of opposite side portions. The upper end of the central portion of the airflow path is registered with the central downwardly opening air inlet and the upper ends of the opposite side portions of the flow path are disposed outwardly of the opposite sides of the airflow heat exchanger. A pair of opposite side upper extensions are provided for the bulkhead and mounted on the latter in adjusted upward extended positions relative thereto. The extension define open ended horizontal flow paths above the upper marginal edge of the bulkhead upwardly into which the upper ends of the opposite side portions of the upstanding return airflow path open. The remote ends of the horizontal flow paths open horizontally outwardly along the one wall and the adjacent ends of the horizontal flow paths are registered with the opposite side air inlets of the airflow heat exchanger assembly.

3 Claims, 9 Drawing Figures

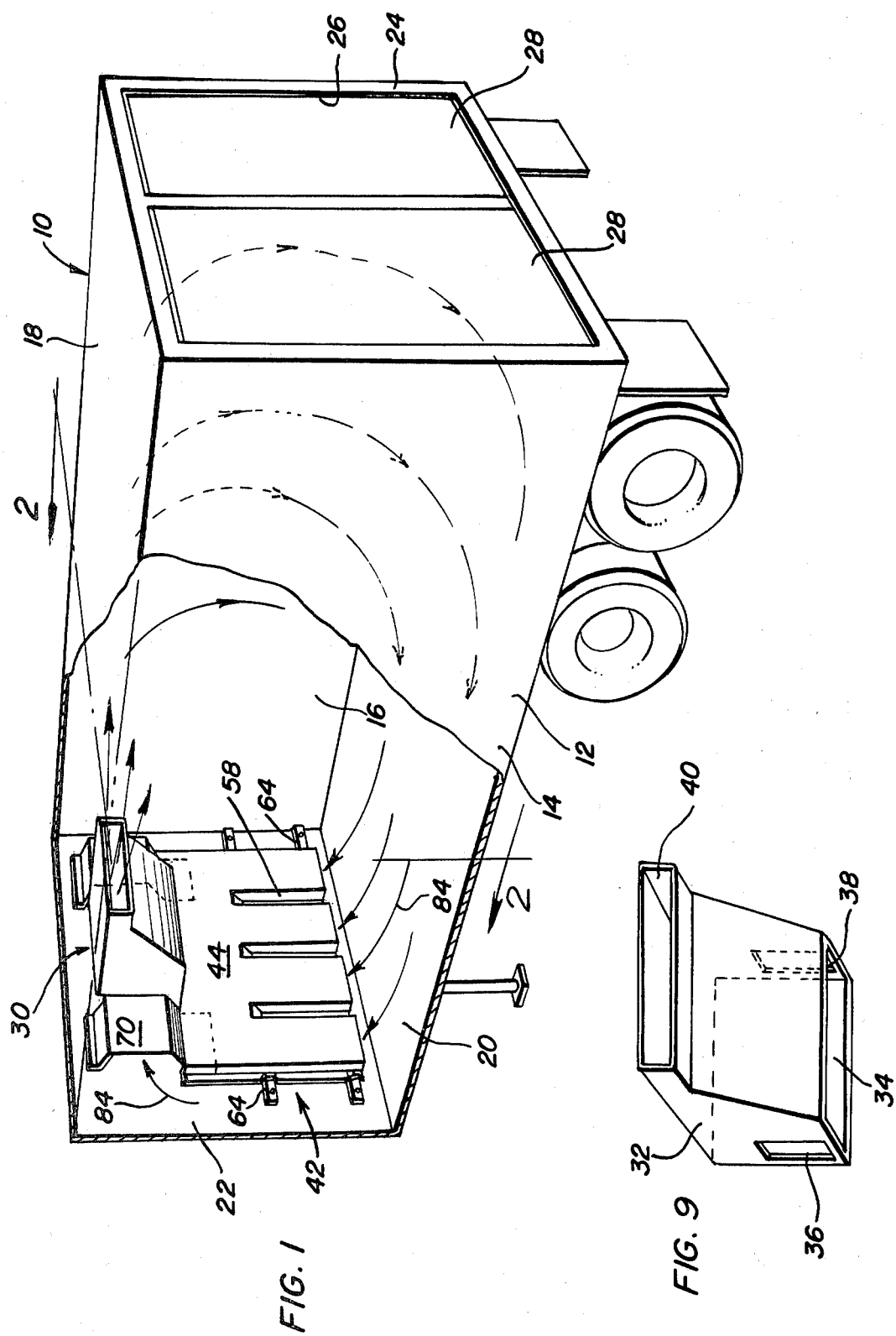

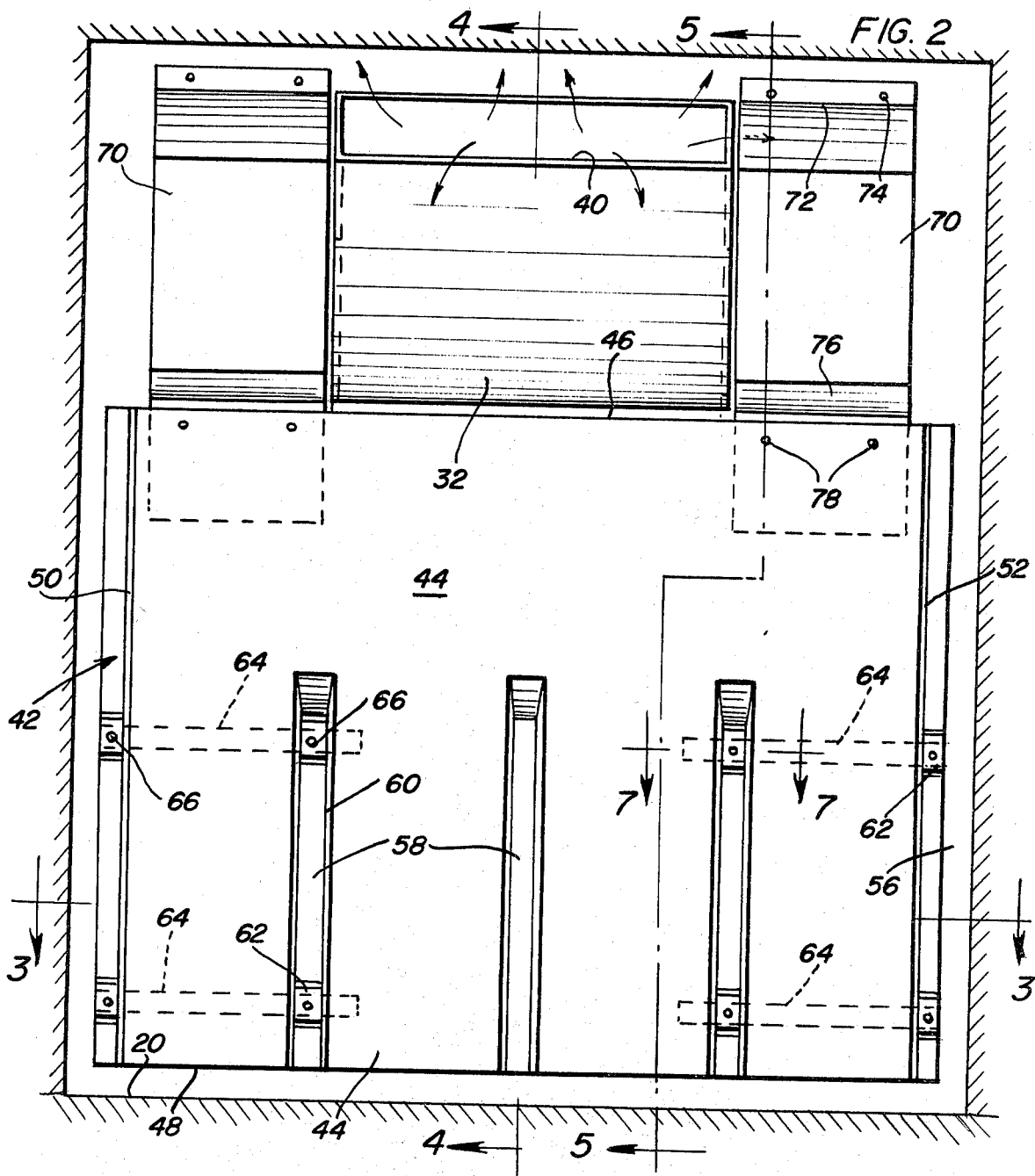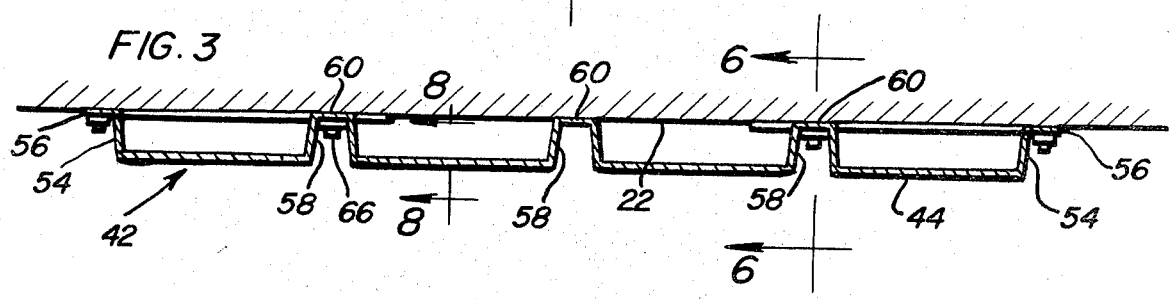

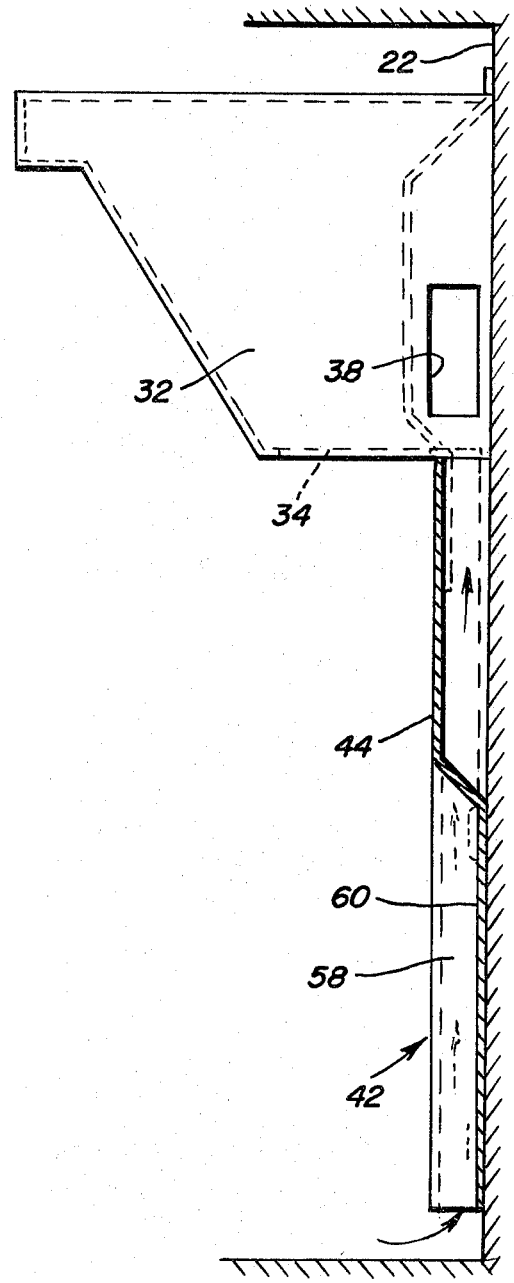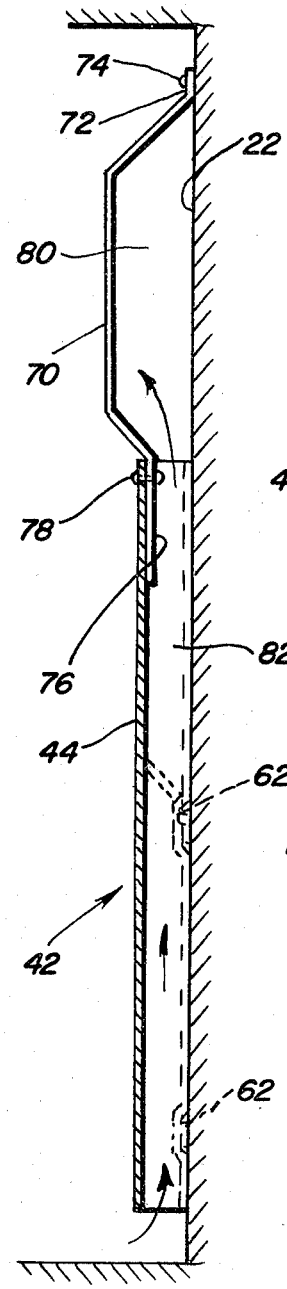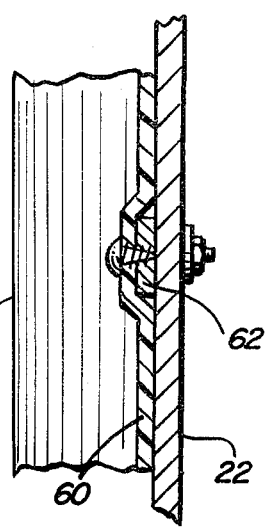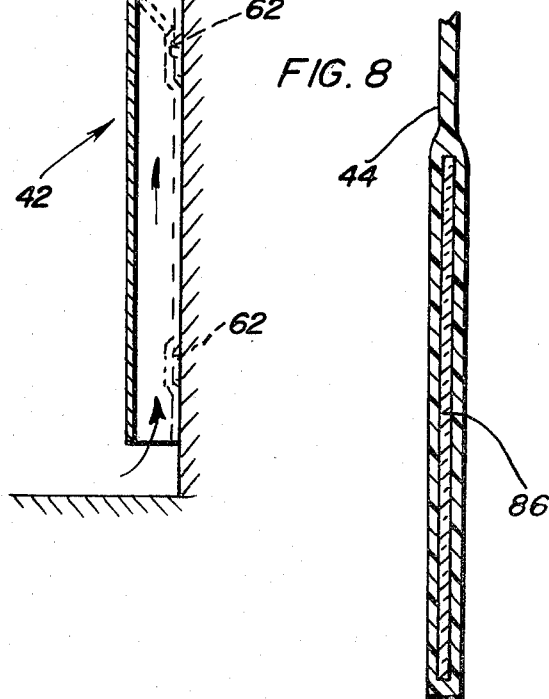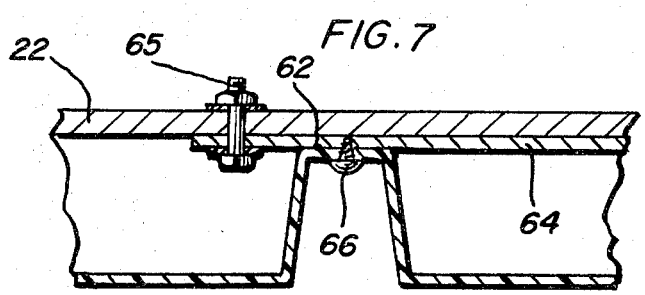

CORRUGATED AIR RETURN BULKHEAD

BACKGROUND OF THE INVENTION

In many instances, loads to be transported in a refrigerated state are loaded within an insulated container such as the body of a trailer and the trailer body is equipped with a wall mounted cooler unit including an interiorly mounted heat exchanger assembly including a central downwardly opening air inlet, a pair of upper opposite side horizontally and outwardly opening air inlets and a central upper temperature conditioned air outlet. If the load to be transported in a chilled state is properly loaded within the body and maintained in its properly loaded position within the body, ample return airflow to the heat exchanger assembly and conditioned air outflow from the heat exchanger assembly may be maintained. However, loads often shift during transit and the person or persons positioning the load within the insulated body cannot always be relied upon to maintain the proper spacing between the load and the return air inlets for the heat exchanger assembly. Accordingly, a need exists for structure by which proper return airflow paths to the heat exchanger assembly may be maintained between the interior wall surfaces of the body and a load disposed within the body.

Examples of various assembles designed to establish and maintain proper airflow about a load within a container body are disclosed in U.S. Pat. Nos. 3,092,220, 3,206,946, 3,246,592, 3,308,738, 3,421,340, 3,977,209, 4,132,088 and 4,143,588. However, these previously known forms of assemblies are not specifically designed both as a return airflow path forming duct and also as a load position maintaining bulkhead capable of resisting high thrust loads thereon.

BRIEF DESCRIPTION OF THE INVENTION

The bulkhead of the instant invention is to be mounted upon the inner surface of one wall of a refrigerated container having an airflow heat exchanger assembly mounted on an upper portion of that one wall including a central downwardly opening air inlet, a pair of upper opposite side horizontally and oppositely opening air inlets and a central upper temperature conditioned air outlet. The bulkhead is corrugated and defines a vertical airflow path whose upper central portion is registered with the aforementioned central downwardly opening air inlet and whose upper opposite side portions open upwardly along side the associated heat exchanger assembly. The upper opposite side portions of the bulkhead include upper extensions vertically adjustable relative thereto defining open ended horizontal flow paths above the upper marginal edge of the bulkhead and into which the upper portions of the opposite side portions of the upstanding airflow path open, the remote ends of the horizontal flows paths opening horizontally outwardly along the corresponding wall and the adjacent ends of the horizontal flow paths being registered with the opposite side air inlets of the heat exchanger assembly.

The bulkhead is constructed of fiberglass and is corrugated for strength.

The main object of this invention is to provide a return airflow path defining bulkhead for use in conjunction with an interior wall surface mounted heat exchanger assembly and constructed in a manner whereby an ample return airflow passage for the heat exchanger assembly will be maintained, even in the event of shifting of the refrigerated load in the container.

Another object of this invention is to provide a bulkhead in accordance with the preceding object and which will also function as a load barrier against shifting of the associated load toward damaging impact with the wall of the associated container.

Another important object of this invention is to provide a bulkhead and mounting structure therefor whereby the bulkhead may be readily mounted on an associated wall of containers of different manufacture.

A further object of this invention is to provide a bulkhead of reinforced design whereby the bulkhead will be afforded additional strength to resist damage as a result of cargo load shifting during transit and forklift abuse during loading.

Yet another object of this invention is to provide a bulkhead having exposed surfaces conforming to USDA requirements.

Still another important object of this invention is to provide a bulkhead in accordance with the preceding objects and mounting structure therefor whereby the bulkhead may be readily secured in desired elevated position upon an associated container wall.

A final object of this invention to be specifically enumerated herewith is to provide a bulkhead in accordance with the preceding objects and which will conform to conventional forms of manufacture, be of simple construction and easy to install so as to provide a device that will be economically feasible, long lasting and trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a typical form of insulated semi-trailer body with portions of the forward end of the trailer body being broken away and illustrated in vertical section and illustrating the bulkhead of the instant invention mounted on the front wall of the trailer body in operative association with a heat exchanger unit;

FIG. 2 is an enlarged transverse vertical sectional view taken substantially upon the plane indicated by the section line 2—2 of FIG. 1;

FIG. 3 is a horizontal sectional view taken substantially upon the plane indicated by the section line 3—3 of FIG. 2;

FIG. 4 is a vertical sectional view taken substantially upon the plane indicated by the section line 4—4 of FIG. 2;

FIG. 5 is a vertical sectional view taken substantially upon the plane indicated by the section line 5—5 of FIG. 2;

FIG. 6 is an enlarged fragmentary vertical sectional view taken substantially upon the plane indicated by the section line 6—6 of FIG. 3;

FIG. 7 is an enlarged fragmentary vertical sectional view taken substantially upon the plane indicated by the section line 7—7 of FIG. 2;

FIG. 8 is an enlarged vertical sectional view substantially upon the plane indicated by the section line 8—8 of FIG. 3; and FIG. 9 is a perspective view of the housing portion of the associated heat exchanger assembly.

DETAILED DESCRIPTION OF THE INVENTION

Referring now more specifically to the drawings, the numeral 10 generally designates a conventional form of a semi-trailer including a load body 12 of conventional design including opposite sidewalls 14 and 16, top and bottom walls 18 and 20 and front and rear walls 22 and 24. The rear wall 24 includes a large opening 26 formed therein removably closed by suitable doors 28.

An evaporator unit comprising a heat exchanger assembly referred to in general by the reference numeral 30 and including a housing 32 is mounted on the front wall 22 in elevated position thereon and includes a central downwardly opening return air inlet 34, a pair of upper opposite side air inlets 36 and 38 and an upper central conditioned air outlet 40.

All of the aforementioned structure is to be considered as conventional. It is further pointed out that when the load body is loaded an inexperienced person carrying out the loading operation may sometimes load the interior of the load bed or container 12 in a manner such that upward flow of air to the inlet 34 and inward flow of air to the inlets 36 and 38 is partially blocked. Accordingly, operation of the heat exchanger assembly 30 is impaired with the result that the load in the load body or container 12 is not maintained at the proper temperature.

In order to insure proper return airflow to the inlets 34, 36 and 38, a bulkhead referred to in general by the reference numeral 42 is provided. The bulkhead 42 comprises a panel 44 of fiberglass reinforced plastic material including an outer smooth gel coat for USDA approval and the panel 44 includes upper and lower marginal edge portions 46 and 48 as well as upstanding opposite side marginal edge portions 50 and 52. The edge portions 50 and 52 include first generally right angular flanges 54 directed toward the front wall 22 and the free forward edges of the flanges 54 terminate in oppositely directed mounting flanges 56 for abutting engagement with the inner surface of the wall 22. Thus, the bulkhead 44 defines a shallow upstanding channel member opening toward the front wall 22. In addition, the approximate lower 60% of the panel 44 includes transversely spaced vertical corrugations 58 including ridge portions 60 substantially coplanar with the flanges 56 and which also abut the front wall 22. Also, the ridge portions 60 of the corrugations 58 include vertically spaced sets of horizontally aligned notches 62 formed therein opening toward the front wall 22.

The center corrugation 58 is free of the notches 62, but the opposite side corrugations 58 include the notches 62 and corresponding portions of the flanges 56 are also provided with similar notches.

Four mounting bars 64 are provided and are secured in any convenient manner to the front wall 22 by means of suitable fasteners 65 secured through the wall 22 and any vertical interior structural members thereof. The bars 64 are horizontal and are mounted in position on the wall 22 in the desired elevation. The panel 44 is thereafter abutted against the wall 22 and secured to the bars 64 through the utilization of suitable fasteners 66 secured through the ridge portions 60 and in the bars 64. In this manner, the lower marginal edge portion 48 may be disposed in proper elevated position above the bottom wall 20 of the load bed 12 in order that the upper marginal edge portion 46 of the panel 44 may be spaced but slightly beneath the central downwardly opening return air inlet 34 of the housing 32.

The opposite side portions of the upper marginal edge portion 46 of the panel 44 have extension members 70 operatively associated therewith and it may be seen from FIGS. 2 and 5 of the drawings that the extension members 70 define generally horizontally disposed channel members. The upper marginal edge portions 72 of the extension members 70 may be secured to the wall 22 by suitable fasteners 74 and the lower marginal edge portions of the extension members 70 include tongue portions 76 which overlap behind and extend downwardly along the adjacent side portions of the upper marginal edge of the panel 44 and which may be secured to the panel 44 through the utilization of fasteners 78 after the desired elevation of the extension members 70 is determined.

The channel members 70 define open ended horizontal flow paths 80 into which the upper ends of the opposite side portions of the flow path 82 defined by the panel 44 open. The remote ends of the flow paths 80 open horizontally outwardly along the upper portion of the front wall 22 toward the side walls 14 and 16 and the adjacent ends of the flow paths 80 are registered with the return air inlets 36 and 38. Accordingly, from the airflow path indicating arrows 84 illustrated in FIG. 1 of the drawings it may be seen that the evaporator unit or heat exchanger assembly 30 has the bulkhead 42 operatively associated therewith in a manner whereby all of the return airflow paths toward the inlets 34, 36 and 38 are shielded.

As may best be seen from FIGS. 2, 3 and 8 of the drawings, it may be seen that the lower marginal portion of the panel 44 include internal reinforcing 86 to provide the panel 44 with additional strength to resist damage as a result of forklift abuse and it is to be noted that not only may the panel 44 be properly adjusted in elevation relative to the front wall 22 according to the elevation of the heat exchanger assembly 30 thereon, but the extension members 70 may also be adjusted in elevation relative to the panel member 44 to also insure proper registry of the adjacent ends of the flow paths 80 with the air inlets 36 and 38.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a container for storage and shipment of temperature controlled materials and wherein said container includes an airflow heat exchanger assembly mounted on a upper portion of one wall of said container and said heat exchanger assembly includes a central downwardly opening air inlet, a pair of upper opposite side horizontally and oppositely outwardly opening side air inlets and a central upper temperature conditioned air outlet, an air return bulkhead including upstanding opposite side marginal edges and top and bottom marginal edges and mounted on said one wall defining, in conjunction with said one wall, an upstanding return airflow path between said one wall and said bulkhead bounded by said side marginal edges and including a central portion and opposite side wall portions, the central portion of the upper end of said return airflow path being registered with said central downwardly opening air inlet, upper opposite side extensions for said bulkhead vertically adjustable relative thereto and defining open ended horizontal flow paths above said top marginal edge and into which the opposite side portions of said upper end of said air return flow path open, the remote ends of said horizontal flow paths opening outwardly along said one wall and the adjacent ends of said horizontal flows paths being registered with said side air inlets, a plurality of vertically spaced horizontal mounting bars secured to said front wall, said bulkhead including vertically extending laterally spaced corrugations formed in at least the lower portion thereof with portions of said corrugations abutted against said one wall, said portions of said corrugations including a plurality of vertically spaced sets of horizontally spaced and aligned notches formed therein in which longitudinally spaced portions of said bars are received, the notched portions of said corrugations being removably secured to said bars.

2. The combination of claim 1 wherein said container is elongated and said one wall comprises an end wall of said container.

3. The combination of claim 2 wherein said container comprises an insulated load body mounted on a trailer chassis, said one wall comprising the forward wall of said load body.

* * * * *